United States Patent
Kalra et al.

(10) Patent No.: US 9,038,920 B2
(45) Date of Patent: May 26, 2015

(54) SYSTEMS AND METHODS FOR ELECTRO-HYDRODYNAMIC WIND ENERGY CONVERSION

(75) Inventors: Chiranjeev Kalra, Glenville, NY (US); Charles Erklin Seeley, Niskayuna, NY (US); Dmytro Floriyovych Opaits, Glenville, NY (US); Sunilkumar Onkarnath Soni, Albany, NY (US); Gary Lee Leonard, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 808 days.

(21) Appl. No.: 13/332,394

(22) Filed: Dec. 21, 2011

(65) Prior Publication Data

US 2013/0015257 A1 Jan. 17, 2013

(51) Int. Cl.
  H02N 3/00 (2006.01)
  H02N 11/00 (2006.01)
  B05B 5/025 (2006.01)
  B05B 17/06 (2006.01)
  B05B 7/00 (2006.01)
  B05B 3/10 (2006.01)

(52) U.S. Cl.
  CPC ............... B05B 5/0255 (2013.01); H02N 3/00 (2013.01); B05B 7/0012 (2013.01); B05B 7/0075 (2013.01); B05B 3/1014 (2013.01); B05B 17/0615 (2013.01)

(58) Field of Classification Search
  CPC ...... H02N 3/00; H02N 11/002; B05B 3/1014; B05B 5/025; B05B 5/0255; B05B 5/03; B05B 5/053; B05B 5/057; B05B 5/087; B05B 7/0012; B05B 7/0075; B05B 17/06; B05B 17/0607; B05B 17/0615
  See application file for complete search history.

(56) References Cited

U.S. PATENT DOCUMENTS 3,225,225 A 12/1965 Wattendorf et al.
3,411,025 A 11/1968 Marks
(Continued)

FOREIGN PATENT DOCUMENTS

DE 102004024822 A1 12/2005
GB 1160360 A 8/1969
(Continued)

OTHER PUBLICATIONS

Masaki et al.,"Study on EHD Wind Power Generation Utilizing a Group of Electrospray", Renewable Energy 2010 Proceedings, pp. 1-4, Jul. 2, 2010.
(Continued)

*Primary Examiner* — Darren W Gorman
(74) *Attorney, Agent, or Firm* — Ann M. Agosti (57) ABSTRACT

An electro-hydrodynamic wind energy conversion system is presented. The system includes a wind passage allowing wind flow. Further, the system includes a reservoir having an opening in communication with the wind passage and configured to hold a liquid. The system also includes an agitator coupled to the reservoir and configured to convert the liquid into droplets. Additionally, the system includes a charging system disposed substantially opposite the reservoir opening and configured to deposit an electrostatic charge on the droplets and draw the droplets into the wind passage. Moreover, the system includes a charge collector disposed at a distal end of the wind passage and configured to collect the electrostatic charge from the droplets.

15 Claims, 3 Drawing Sheets

(56) References Cited

U.S. PATENT DOCUMENTS

| | | |
|---|---|---|
| 3,456,135 A | 7/1969 | Marks |
| 3,519,855 A | 7/1970 | Gourdine |
| 3,651,354 A | 3/1972 | Cowan |
| 4,146,800 A | 3/1979 | Gregory et al. |
| 4,206,396 A | 6/1980 | Marks |
| 4,328,436 A | 5/1982 | Biblarz et al. |
| 4,433,248 A | 2/1984 | Marks |
| 5,266,098 A | 11/1993 | Chun et al. |
| 6,200,539 B1 | 3/2001 | Sherman et al. |
| 6,302,331 B1 | 10/2001 | Dvorsky et al. |
| 6,339,897 B1 | 1/2002 | Hayes et al. |
| 6,440,600 B1 | 8/2002 | Starzak |
| 2002/0050719 A1 | 5/2002 | Caddell et al. |
| 2009/0155090 A1 | 6/2009 | Schlitz |
| 2009/0218910 A1 | 9/2009 | Carmein et al. |
| 2010/0116469 A1 | 5/2010 | Jewell-Larsen et al. |

FOREIGN PATENT DOCUMENTS

| | | |
|---|---|---|
| GB | 1168449 A | 10/1969 |
| GB | 1237939 A | 7/1971 |
| WO | 2010127178 A1 | 11/2010 |

OTHER PUBLICATIONS

Dawn, Abstract :"Advanced Electrospray Atomization and Space Charge Modeling for Electrohydrodynamic Wind Energy Conversion", SBIR/STTR, 2009; Downloaded on Dec. 21, 2011 from Internet:<http://www.sbir.gov/sbirsearch/detail/138500>; 3Pages.

Djairam et al.,"Controlled and Efficient Electrohydrodynamic Spraying of Water in an Electrostatic Wind Energy Converter (EWICON)", IEEE Digital Library, pp. 169-172, Oct. 26-29, 2008.

Djairam et al.,"Converting Wind Energy to Electrical Energy Using Charged Droplets in an Electric Field", IEEE Digital Library, pp. 474-477, Oct. 14-17, 2007.

SYSTEMS AND METHODS FOR ELECTRO-HYDRODYNAMIC WIND ENERGY CONVERSION

BACKGROUND

Embodiments of the present disclosure relate to wind energy conversion devices, and more particularly to electro-hydrodynamic wind energy conversion devices.

Traditional wind energy conversion devices like wind turbines include multiple mechanical rotating or moving parts such as rotor blades, shafts, generators, gearboxes, brakes, and the like. Wind impinging on the blades causes the blades to rotate. This rotation is converted into electrical energy by a generator that is coupled to the blades. Although these wind turbines have proved to be highly successful in onshore and offshore windy regions, they require expensive parts and are often viewed as unaesthetic objects. Moreover, as the mechanical wind turbines include noisy rotating and moving parts, they are unsuitable for certain areas.

Recently, as an alternative to the mechanical wind turbines, wind energy conversion devices that work on the principles of electro-hydrodynamics (EHD) have been developed. These devices do not generate electricity through the motion of any moving parts; instead, they generate electricity by generating small electrically charged liquid droplets and/or solid particles and introducing them into the wind path. The wind carries the charged droplets and/or particles towards a collection grid, where the electric charge of the droplets is deposited. In these systems, the wind speed determines the number of liquid droplets and/or solid particles carried away from the injection point per unit time, and therefore the amount of electrical energy generated by the device. These EHD wind energy conversion devices are capable of generating electricity akin to the mechanical wind turbines without the added noise or moving parts. Moreover, these devices are inexpensive, aesthetically more pleasing, and simple to construct.

Existing EHD wind energy conversion devices, however, may not be very efficient. Current technologies use a nozzle or electrospray to convert a liquid into charged droplets. In these technologies, water is pressurized and sprayed out of a point source to form droplets. However, as the nozzles are point sources, they may not be able to produce a large number of droplets or droplets having small dimensions optimal for EHD power conversion. The number and size of droplets are important factors affecting the efficiency of these devices as these factors directly affect the cumulative power generated by the device. For example, if the drops are too large, the drag force of low speed winds may be insufficient to carry the droplets effectively, and if the number of droplets is too low, it may lead to lower power generation.

BRIEF DESCRIPTION

In accordance with aspects of the present disclosure, an electro-hydrodynamic wind energy conversion system is presented. The system includes a wind passage allowing wind flow. The system also includes a reservoir having an opening in communication with the wind passage and configured to hold a liquid. Further, the system includes an agitator coupled to the reservoir and configured to convert the liquid into droplets. In addition, the system includes a charging system disposed substantially opposite the reservoir opening and configured to deposit an electrostatic charge on the droplets and draw the droplets into the wind passage. Moreover, the system includes a charge collector disposed at a distal end of the wind passage and configured to collect the electrostatic charge from the droplets may also be present.

In accordance with another aspect of the present disclosure, a method for converting wind energy into electricity is presented. The method includes storing a liquid in a reservoir having at least one opening in communication with a wind passage, where the wind passage allows wind flow from a proximal direction to a distal direction. Further, the method includes agitating the liquid in the reservoir to form droplets on a liquid surface. The method also includes depositing an electrostatic charge on the droplets. In addition, the method includes drawing the electrostatically charged droplets towards the wind passage. Also, the method includes transporting the electrostatically charged droplets towards a charge collector disposed at the distal end of the wind passage. Moreover, the method includes collecting the electrostatic charge present on the droplets at the charge collector.

In accordance with yet another aspect of the present disclosure, an electro-hydrodynamic wind turbine system is presented. The system includes a wind passage allowing wind flow. Furthermore, the system includes a substantially tubular guiding structure in line with the wind passage having a proximal end and a distal end and configured to allow the wind flow. The system further includes a reservoir having an opening in communication with the wind passage coupled to a sidewall of the guiding structure and configured to hold a liquid. Moreover, the system includes an agitator coupled to the reservoir and configured to convert the liquid into droplets. The system also includes a charging system coupled to the guiding structure. Additionally, the system includes the charging system is configured to deposit an electrostatic charge on the droplets, and draw the droplets into the guiding structure. Also, the system includes a charge collector disposed at the distal end of the guiding structure and configured to collect the electrostatic charge from the droplets.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure are related to a system and method for electro-hydrodynamically extracting electrical energy from wind. The systems described hereinafter generate a large number of micron-sized droplets, which increase the cumulative charge generated by the system, and in turn enhance the efficiency of the system.

Conventional solutions that utilize electrosprays or nozzles to generate charged droplets fail to produce a large number of droplets. In particular, in a conventional electrospray system pressurized liquid is dispensed through a pointed end of a nozzle to produce droplets, thereby resulting in the generation of a limited number of droplets. To increase the number of droplets generated, these systems can increase the size of the orifices. However, increasing the size of the orifices results in an increase in the droplet size. It may be noted that in certain cases no droplets may be formed because of the large orifice size. Alternatively, these systems may increase the number of nozzles. However, increase in the number of nozzles increases design and manufacturing complexities, and induces high drag. Consequently, these conventional systems fail to generate sufficient number of droplets, and therefore fail to generate sufficient cumulative charge. To increase their efficiency, these systems may attempt to place a larger charge on each droplet by introducing a large electrostatic field. However, the amount of charge that can be effectively placed on a droplet is governed by Rayleigh's limit. Beyond a certain charge value, increasing the charge on the droplets reduces the efficiency of the system. Therefore, the efficiency of these conventional systems is limited by their design.

The shortcomings of the presently available technologies may be circumvented by an exemplary EHD system. In accordance with various embodiments of the exemplary EHD system, droplets are generated from the surface of a liquid through liquid agitation, thereby substantially increasing the number of droplets generated at any given time. For example, embodiments of the EHD system generate droplets in a range from about 10 million droplets per second per $cm^2$ to about 1000 million droplets per second per $cm^2$. Moreover, the size of the droplets is a function of the agitating frequency, and therefore may be configurable. With the large number of droplets generated, voltage levels may be lowered, charge per droplet may be reduced, and the system may still achieve a higher cumulative charge.

Figure 1:
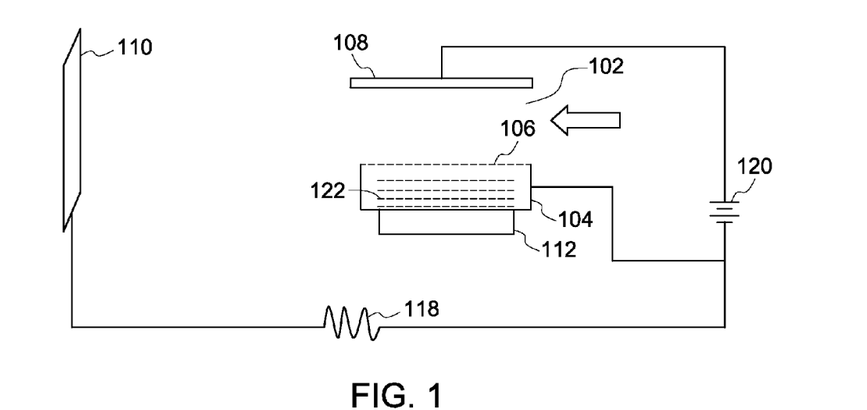
FIG. 1 is a block diagram of an exemplary EHD system for use in a wind turbine, in accordance with aspects of the present disclosure.
Figure 2:
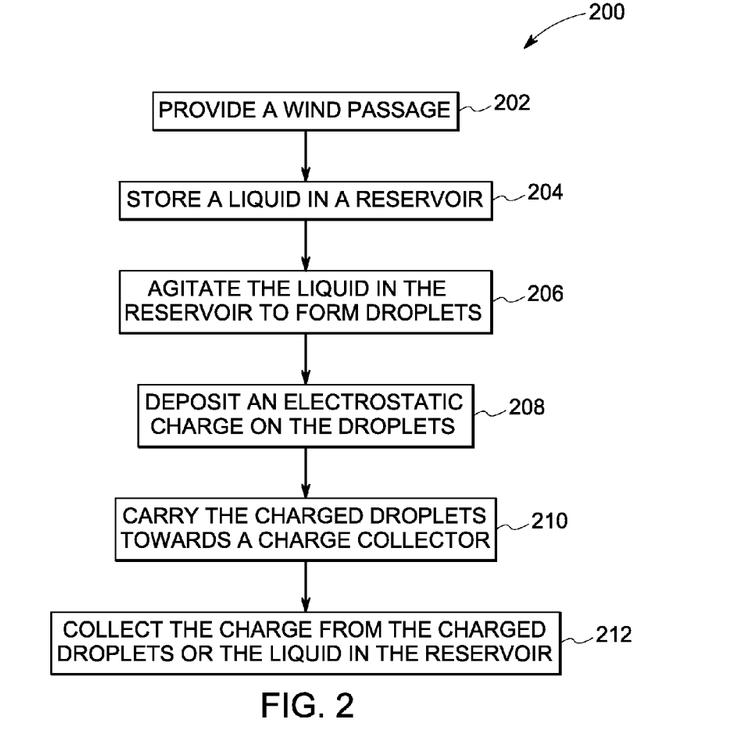
FIG. 2 is a flowchart illustrating an exemplary method for converting wind energy into electricity, in accordance with aspects of the present disclosure.

FIG. 1 illustrates an exemplary embodiment of an electrohydrodynamic (EHD) system 100. In a presently contemplated configuration, the EHD system 100 may include a reservoir 104. The reservoir 104 may include an opening 106 that is in communication with a wind passage 102 in which wind blows in a particular direction (in FIG. 1, the arrow indicates the direction of wind flow). In some embodiments, the wind passage 102 may include a guiding structure (not shown in FIG. 1) that guides wind from a proximal end to a distal end; while in other embodiments, the wind passage 102 may not include any guiding structure and may merely include space above the reservoir opening 106 where wind may pass. For the purpose of this disclosure, the term proximal direction is used to refer to a direction from which wind blows and the term distal direction is used to refer to a direction into which the wind blows. In a similar fashion, the term proximal end is used to refer to an end of the wind passage 102 into which the wind blows, while the term distal end is used to refer to an end of the wind passage 102 at which the wind exits the wind passage 102.

Further, the system 100 may also include an electrostatic charging system 108 that is operatively coupled to the reservoir 104 or the guiding structure. Alternatively, the charging system 108 may not be coupled to the reservoir 104 or the guiding structure. Instead, it may be a standalone device placed relatively opposite the reservoir opening 106. Additionally, the system 100 may also include a charge collector 110 disposed distal of the reservoir opening 106 and the charging system 108 in the wind passage 102 such that a face of the charge collector 110 is substantially in the wind path. The reservoir 104 may be filled with a liquid 122. Further, an agitator 112 may be coupled to the reservoir 104 and configured to sufficiently agitate the liquid 122 such that small droplets form on a surface of the liquid 122.

Figure 3:
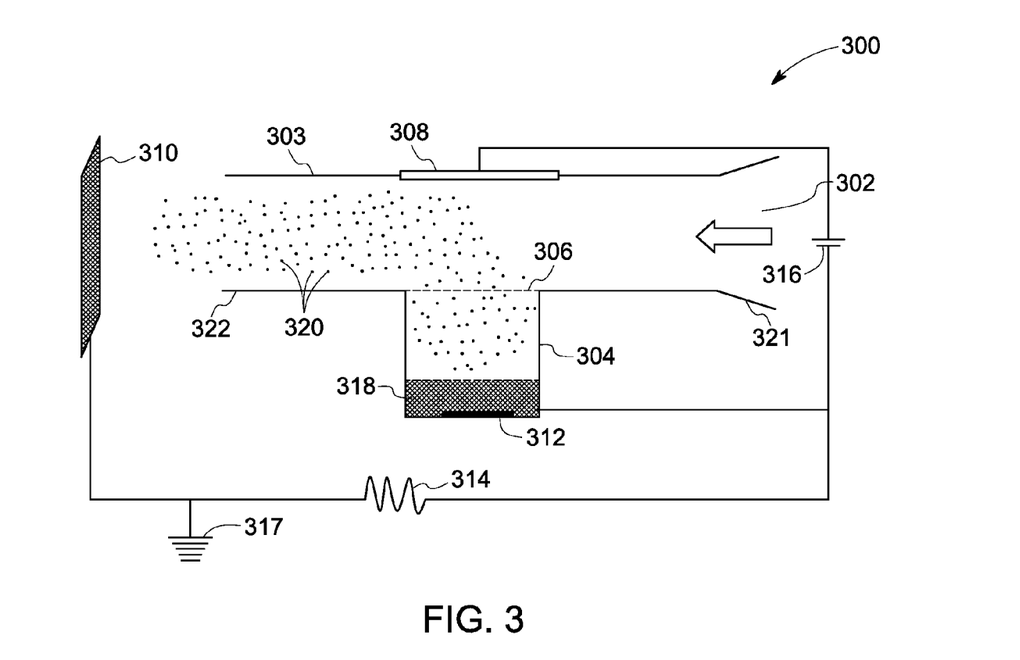
FIG. 3 is a diagrammatic representation of an exemplary EHD system, in accordance with aspects of the present disclosure.
Figure 4:
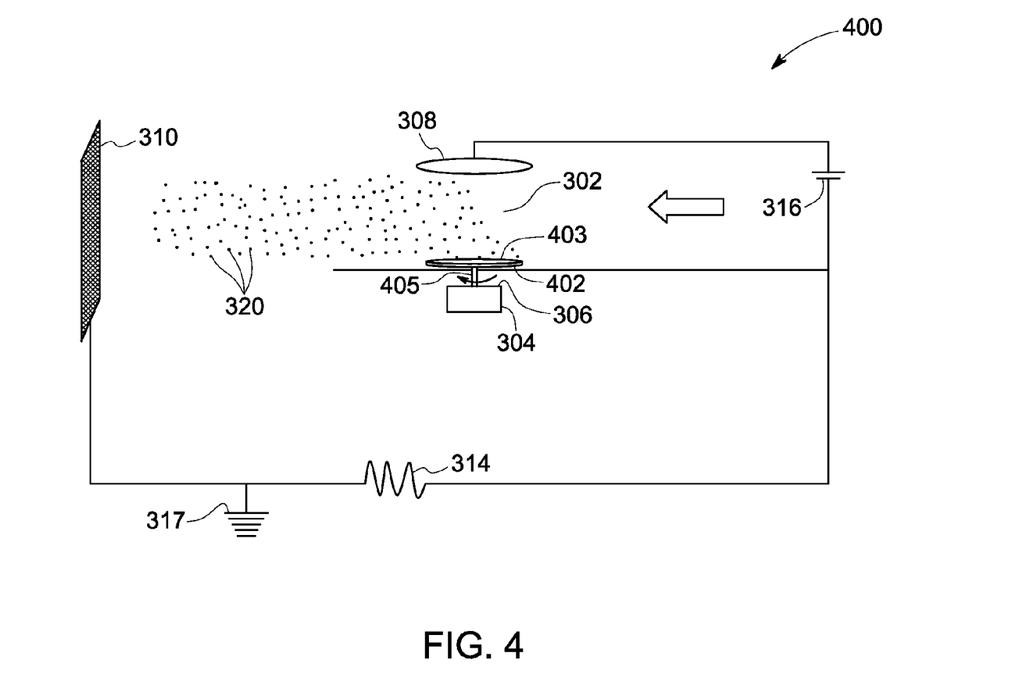
FIG. 4 is a diagrammatic representation of another exemplary EHD system, in accordance with aspects of the present disclosure.
Figure 5:
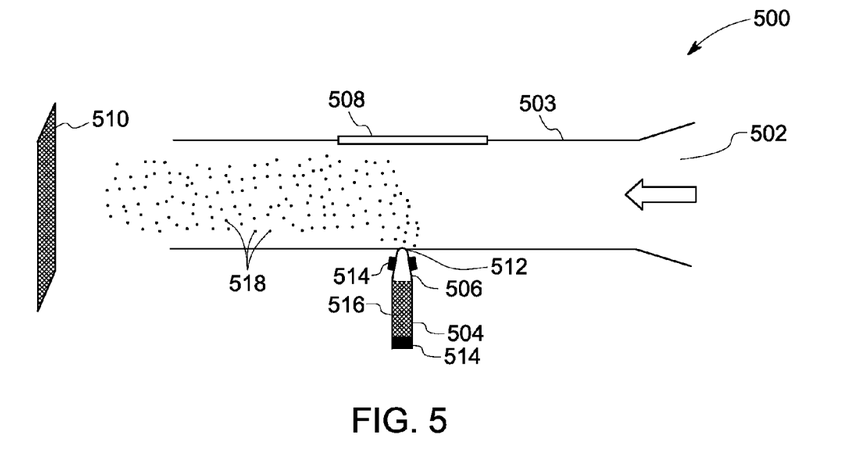
FIG. 5 is a diagrammatic representation of yet another exemplary EHD system, in accordance with aspects of the present disclosure.
Figure 6:
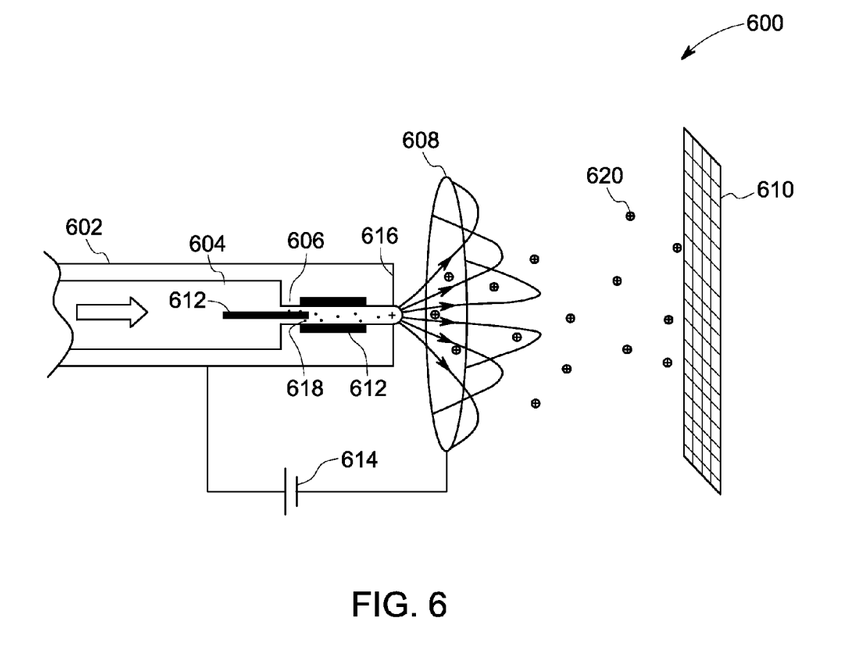
FIG. 6 is a diagrammatic representation of yet another exemplary EHD system, in accordance with aspects of the present disclosure.

In one example, the wind passage 102 may be the space between the reservoir opening 106 and the charging system 108 through which wind blows. In some embodiments, the guiding structure may be present in this passage 102 to guide the wind along a fixed path. In other embodiments, no physical guiding structure may be present in the wind passage 102. Moreover, in some embodiments, the reservoir 104 and the charging system 108 may be normal to the wind passage 102 (as illustrated in FIGS. 3-5); while in other embodiments, the reservoir 104 and the charging system 108 may be in line with the wind passage 102 (as illustrated in FIG. 6).

Also, the reservoir 104 may have any shape or size. For example, the reservoir 104 may be cylindrical, cuboidal, or polygonal. Furthermore, the reservoir 104 may have a liquid intake opening (not shown in FIG. 1) in addition to the reservoir opening 106. The liquid intake opening may be situated along the surface of the reservoir 104. For example, the liquid intake opening may be situated on one or more of the sidewalls of the reservoir 104. In other embodiments, the liquid intake opening may be situated at the bottom of the reservoir 104. Depending on the level of the liquid 122 in the reservoir 104, the liquid intake opening may automatically open, allowing the liquid 122 to enter the reservoir 104. Alternatively, an operator may monitor the liquid level, and in particular, when the liquid level falls below a threshold value, the operator may open the intake opening, allowing the liquid 122 to enter the reservoir 104. In other embodiments, liquid may be continuously filled in the reservoir 104 at particular rate. It will be understood that various means and mechanisms exist to fill a reservoir with liquid and monitor the liquid levels. Any of these known mechanisms may be employed in this system 100 without departing from the scope of the present disclosure.

Moreover, the reservoir 104 may be formed using an electrically insulative material such that the reservoir 104 does not interfere with the working of the EHD system 100. Example materials may include glass, plastic, or polymers. In some instances, the reservoir 104 may be coated with a lubricious or non-stick material such as Teflon™ (polytetrafluoroethylene) to prevent the liquid 122 from adhering to the reservoir walls. It may be noted that the reservoir 104 may be temporarily or permanently coupled to the guiding structure in the wind passage 102. Temporary coupling allows operators to remove the reservoir 104 for cleaning, maintenance and/or replacement. Example temporary coupling means include screw fit arrangements, luer-locks, snap-fit arrangements, and so on. Permanent attachment ensures that a fit between the reservoir 104 and the guiding structure is secure such that the reservoir 104 may not be inadvertently detached from the guiding structure during operation. Means of permanently fitting the reservoir 104 to the guiding structure may include welding, gluing, or molding.

The charging system 108 may be an electrostatic ring, a rod or a plate, in some embodiments. In other embodiments, the charging system 108 may be plasma or an electron beam. Further, as previously noted, the charging system 108 may be disposed at a location substantially opposite the reservoir opening 106.

The charge collector 110 may be a charge collection grid or mesh coupled to an electrical circuit. Alternatively, the charge collector 110 may simply be a connection to ground. Considerable flexibility is afforded in the size and shape of the charge collector 110. For example, the charge collector 110 may be shaped as a rectangular grid placed normal to the longitudinal axis of the wind passage 102. Positioning the charge collector 110 as described hereinabove enhances charge collection from droplets exiting the wind passage 102. In other examples, the charge collector 110 may be shaped as a concave or convex mesh without departing from the scope of the present disclosure. In case the charge collector 110 is a ground connection, the charge on the droplets is simply driven to ground and the charge in the liquid remaining in the reservoir 104 may be utilized to produce a working current.

In addition to the elements described hereinabove, various other systems, modules, or devices may be coupled to or be part of the EHD system 100 contributing to its function. For example, a yaw sensor may be coupled to the EHD system 100 to monitor wind direction and align the wind passage 102 and the charge collector 110 in line with the wind and distal of the reservoir 104, respectively. Similarly, a power supply may be coupled to the charging system 108, where the power supply may be configured to provide the charging system 108 the required electrostatic potential to cause charge separation in the liquid 122. In addition to these elements, the system 100 may also include electrical connections between the various elements to complete a charging circuit. For example, in case the charge collector 110 accumulates charge, the charge collector 110 may be coupled to a load 118 to produce working current. Also, the charging system 108 may be coupled to one end of a power supply 120 configured to supply an electrostatic potential to the charging system 108. Moreover, the other end of the power supply 120 may also be coupled to the load 118 to complete the electrical circuit between the charging system 108, the power supply 120, the charge collector 110, and the load 118. In case the charge collector 110 is configured to simply ground the droplet charge, the load 118 may be coupled between the reservoir 104 and ground (not shown) and the power supply 120 may be coupled to the charging system 108 and between the reservoir 104 and the load 118. The EHD system 100 may further include humidity sensors (not shown in FIG. 1) to monitor the operating conditions, wind speed sensors to monitor wind speed, lightening protection bars, and the like.

It may be noted that although FIGS. 1, 3-6 depict use of a one reservoir and one reservoir opening, use of multiple reservoirs and/or reservoir openings in the EHD system 100 is also envisaged. Depending on the required power output, the number of reservoirs and reservoir openings may be varied.

FIG. 2 illustrates an exemplary method for converting wind energy into electricity using the exemplary EHD system 100 of FIG. 1. It may be noted that the method of FIG. 2 is described with reference to the components of FIG. 1. The method begins at step 202 where a wind passage, such as the wind passage 102 is provided. Subsequently, at step 204, a liquid such as the liquid 122 is stored in the reservoir 104, where the reservoir 104 has at least one reservoir opening 106 in communication with the wind passage 102. A liquid agitator, such as the agitator 112 may be configured to agitate the liquid 122 at a determined frequency, as indicated by step 206. In one embodiment, the frequency may be in the range from about 1 MHz to about 1000 MHz. Such an agitation vibrates the liquid 122 causing small droplets to form on the liquid surface.

Moreover, at step 208, the charging system 108 applies an electrostatic field on the liquid surface causing charge separation. The charge separation causes the liquid droplets to accumulate a positive or negative charge on their surface. Also, a charge that is opposite to the charge on the droplets is accumulated in the liquid left behind in the reservoir 104. For example, if the charging system 108 is at a positive potential, a negative charge accumulates along the surface of the droplets and a positive charge accumulates in the liquid remaining in the reservoir 104. This negative charge causes the droplets to drift towards the charging system 108, which is at a positive potential, as depicted by step 210. The drag force of the wind blowing in the wind passage 102, however, exceeds the force of the electrostatic field between the charging system 108 having a positive potential and the negatively charged droplets, thereby curtailing the movement of the droplets towards the charging system 108. Instead, the droplets are carried towards a distal end of the wind passage 102. Additionally, at step 212, the charge collector 110 may either collect the negative charge of the droplets or drive the negative charge to ground. In case the charge collector 110 accumulates the negative charge of the droplets, a load may be connected to the charge collector 110 to produce a working current.

The following sections describe some exemplary embodiments of the EHD system 100 of FIG. 1. It will be understood that other configurations may just as easily be considered without departing from the scope of the present disclosure.

Turning now to FIG. 3, an exemplary EHD system 300 is presented. In this example, the system 300 includes a wind passage 302 with a guiding structure 303, and a reservoir 304 disposed substantially normal to the guiding structure 303. Also, the reservoir 304 includes an opening 306, which is coupled to the guiding structure 303 and may be substantially as large as the width of the reservoir 304, in one example. In addition, a charging system 308 such as an electrostatic plate may be disposed over the reservoir opening 306. In other cases, the charging system 308 may be an electrostatic ring having a diameter substantially equal to the diameter of the reservoir opening 306. Moreover, an agitator, in this embodiment, may include one or more piezoelectric crystals 312. Furthermore, in one example, the one or more piezoelectric crystals 312 may be disposed at the bottom of the reservoir 304 and in contact with a liquid 318 present in the reservoir 304. A power supply 316 may provide charging voltage or current to the charging system 308. Moreover, a charge collector 310 such as a collection grid may be placed at a distal end of the guiding structure 303. This grid 310 may further be coupled to the power supply 316 through a load 314 to complete the charging circuit. A ground connection 317 may be provided between the charge collector 310 and the load 314.

The guiding structure 303 may be a substantially hollow cylindrical tube having a proximal end 321 and a distal end 322. For purposes of this disclosure, the proximal end refers to an end of the guiding structure 303 from where wind enters the wind passage 302 and the distal end refers to the end of the guiding structure 303 from where wind exits the wind passage 302. Moreover, the guiding structure 303 may be large enough to allow large amounts of wind to pass through the EHD system 300. In addition, the guiding structure 303 may have a substantially circular, elliptical, rectangular, polygonal, or randomly shaped cross-section without departing from the scope of the present disclosure. In other embodiments, to increase wind velocity, the guiding structure 303 may have a conical or tapered shape. It will be understood that the shape and size of the guiding structure 303 may vary considerably from application to application and therefore embodiments of the present disclosure do not limit the scope of the size and shape of the guiding structure 303.

Further, the guiding structure 303 may be formed using a graded plastic or polymer material. Example materials include steel, carbon fiber, PVC, aluminum, Teflon™ (polytetrafluoroethylene), plastics, nylon, or glass (metals, organic and inorganic materials).

With continuing reference to FIG. 3, the reservoir 304 may be coupled normal to the longitudinal axis of the guiding structure 303. In other embodiments, however, the placement of the reservoir 304 with respect to the guiding structure 303 may vary. For instance, the reservoir 304 may be disposed outside the guiding structure 303 and normal to a longitudinal axis of the guiding structure 303. In this case, the reservoir opening 306 may be coupled to a side wall of the guiding structure 303. Alternatively, the longitudinal axis of the reservoir 304 may be parallel and substantially coincident with the longitudinal axis of the guiding structure 303. In this case, the reservoir 304 may be placed within the guiding structure 303 or at the proximal end 321 or the distal end 322 of the guiding structure 303.

In the system 300, the wide reservoir opening 306 allows a large number of droplets to exit the reservoir 304 and travel towards the charging system 308. Moreover, the reservoir 304 may itself be wider than taller in some embodiments. Greater width allows a greater amount of the liquid 318 to be converted into droplets and subsequently be carried to the collection grid 310. It may be noted that the terms charge collector and collection grid may be used interchangeably.

The piezoelectric crystals 312, when subjected to an electrical field, vibrate at a frequency dependent on the electrical field and the innate properties of the piezoelectric crystals 312. To generate these vibrations, the piezoelectric crystal 312 may be coupled to one or more of an electric generator, an oscilloscope, a transducer, and/or an amplifier. These components generate appropriate sinusoidal signals to induce vibrations in the piezoelectric crystals 312. In other embodiments, a power supply may be coupled to the piezoelectric crystals 312 along with systems that are configured to convert the power into appropriate sinusoidal signals. Since the vibrations of the piezoelectric crystals 312 are dependent on the amplitude of the electric field, the frequency of the vibrations can easily be altered during operation by varying the electric field connected to the piezoelectric crystals 312.

Moreover, during operation, the piezoelectric crystals 312 are vibrated at a determined frequency and the charging system 308 may be energized. Vibrations from the piezoelectric crystals 312 carry into the liquid 318 and vibrate the surface of the liquid 318. When the vibration energy at the liquid surface exceeds the surface tension of the liquid 318, droplets 320 are formed at the liquid surface. Sizes of these droplets 320 depend on the vibration frequency of the piezoelectric crystals 312. Therefore, by varying the electrical field applied to the piezoelectric crystals 312, the vibrating frequency of the piezoelectric crystals 312 may change, which in turn alters the size of the droplets 320. In some instances, the frequency of the piezoelectric crystals 312 is in the Megahertz range and such a frequency may facilitate formation of droplets 320 with diameters in a range from about 1 sub-micron to about 100 microns.

In the present example, the charging system 308 is coupled to the guiding structure 303 at a location that is substantially opposite the reservoir opening 306. Also, the charging system 308 is configured to generate an electric field around the liquid 318 in the reservoir 304 to cause charge separation at the liquid surface. This charge separation in addition to generating charged droplets, aids in reducing the surface tension of the liquid 318 and thereby increasing the droplet production rate. The charge of the droplets 320 is opposite that of the charging system 308 and the liquid left over in the reservoir 304. Being oppositely charged to the charging system 308, the droplets 320 move towards the charging system 308. The wind passage 302 and guiding structure 303, however, are normal to the path of the droplets 320. Wind in the wind passage 302 drags the droplets 320 towards the collection grid 310, where the electrostatic charge of the droplets 320 is collected. The system 300 may form droplets 320 in a range from about 0.10 billion droplets per second to about 100 billion droplets per second from approximately a 10 cm×10 cm cross-section of liquid surface. This droplet formation rate is expected to be substantially higher than the rate of any conventional systems because in the system 300, the droplets 320 are formed using the entire liquid surface.

In another embodiment, instead of the piezoelectric crystals 312, the agitator may be a spinning nonconductive disc. FIG. 4 illustrates an embodiment of a system 400 where the agitator is a spinning non-conductive disc 402. Here, the charging system 308 is coupled to the guiding structure 303 at a location that is substantially opposite the reservoir opening 306, the disc 402 is disposed at the reservoir opening 306 and coupled to the guiding structure 303, and the charge collector 310 is disposed at the distal end of the guiding structure 303. The electrical circuit remains similar to that described with respect to FIG. 3.

The liquid 318 from the reservoir 304 is provided to a surface of the disc 402 that is in communication with the wind passage 302. In one embodiment, the disc 402 may have a small central aperture 403 connected to the reservoir opening 306. Further, a liquid delivery tube 405 may be connected between the aperture 403 and the reservoir opening 306 to provide the liquid 318 from the reservoir 304 to the disc surface. It will be understood that in other embodiments, the liquid 318 may be transported to the disc surface through other means, such as multiple apertures on the disc 402, or a pipe that transports the liquid 318 from the reservoir 304 to the disc surface. Further, the amount of liquid transported to the disc surface is controlled such that at any given time, a thin layer of the liquid 318 is present on the disc surface.

The disc 402 may be coupled to a power supply (not shown) and a motor (not shown) that rotate the disc 402 at a high speed. When the disc 402 rotates at a particular frequency, the centrifugal force of the disc 402 spins the liquid 318 off the edges of the disc 402 to form droplets 320. The number of droplets and their size may be a function of the rotation speed, size of the disc 402, thickness of liquid layer, or liquid type. It will be understood that the number of droplets 320 may be a function of any other parameter just as easily without departing from the scope of the present disclosure. For example, the size of the droplets 320 may be a function of the power of the charging system 308. Further, the disc 402 may be disposed in a horizontal orientation, having upward or downward curved edges. In addition, the disc 402 may have a semi-parabolic or any other shape that assists in droplet formation. In some embodiments, a lubricious or non-stick coating may be applied on the disc 402 to assist the liquid 318 in sliding off the edges of the disc 402 and preventing any liquid from adhering to the disc surface.

The charging system 308 deposits a charge on the droplets 320 generated by the rotating disc 402, and the charged droplets move towards the charging system 308. When these droplets 320 reach the wind passage 302 and the guiding structure 303 the droplets 320 are dragged by the wind in the direction of the charge collector 310 where the charge on the droplets 320 is accumulated.

FIG. 5 illustrates another exemplary embodiment 500 of an EHD system in accordance with some aspects of the present disclosure. The system 500 includes a wind passage 502, a guiding structure 503, a reservoir 504, a reservoir opening 506 in communication with the guiding structure 503, a charging system 508, and a charge collector 510. In the present example, the reservoir opening 506 is substantially smaller than the width of the reservoir 504. For example, if the reservoir width is in a range from about 1 mm to about 10 mm, the width of the reservoir opening 506 in this embodiment may be in a range from about 0.01 mm to about 1 mm. In particular, the reservoir opening 506 may be narrow and tapered like a nozzle 512 or orifice. In other embodiments, more than one nozzle 512 may be provided. Further, in certain other embodiments, multiple reservoirs 504 and nozzles 512 may be coupled along the guiding structure 503 or the wind passage 502. For example, to increase the power output produced by the EHD system 500, two or more reservoirs 504 and nozzles 512 may be incorporated.

The nozzle 512 may be in communication with the guiding structure 503. In addition, the nozzle 512 may be coupled to a sidewall of the guiding structure 503. Further, the charging system 508 may be operationally coupled to the guiding structure 503 at a location that is substantially opposite the nozzle 512. Moreover, the reservoir 506 may include a mechanism to pressurize a liquid 516 or force the liquid 516 into the nozzle 512. These pressurizing elements may include pumps, motors, or other such means without departing from the scope of the present disclosure.

In addition, one or more piezoelectric crystals 514 may be coupled to a neck of the nozzle 512 and within the reservoir 504. These piezoelectric crystals 514 may be configured to agitate the pressurized liquid as the liquid 516 travels towards the nozzle 512. When the liquid 516 reaches the nozzle opening, the liquid 516 forms a convex meniscus. The vibrations induced by the piezoelectric crystals 514 vibrate this meniscus before the meniscus forms a drop, thereby breaking up the meniscus into a plurality of smaller droplets 518. By breaking the meniscus into the plurality of smaller droplets 518, the system 500 generates an increased number of droplets 518 and also reduces the size of the droplets 518.

In conventional electrosprays, the droplet size is governed by the size of the opening and the velocity of the liquid exiting the opening. In this system 500, however, the droplet size is also governed by the vibration frequency of the piezoelectric crystals 514. Consequently, the size of the droplets 518 exiting the nozzle 512 may be controlled by adjusting the frequency of the piezoelectric crystals 514. In this way, the system 500 can generate an increased number of droplets as compared to a conventional electrospray system.

Moreover, the charging system 508 deposits a charge on the droplets 518 forcing the droplets 518 to move towards the charging system 508. The wind passage 502 that is disposed between the charging system 508 and the nozzle 512 draws the droplets 518 towards the charge collector 510 disposed at a distal end of the wind passage 502.

Another exemplary embodiment 600 of the EHD system is illustrated in FIG. 6. The system 600 includes a wind passage 602, a reservoir 604, a nozzle 606, a charging system 608, a charge collector 610, one or more piezoelectric crystals 612, and a power supply 614. In a presently contemplated configuration, the nozzle 606 is coincident with the wind passage 602. Additionally, the charging system 608 may be disposed at a location that is approximately/substantially opposite the nozzle 606 and at a distance from the nozzle 606. Further, the charging system 608 may be in line with the wind passage 602.

It may be noted that in the illustrated embodiment, a guiding structure is not present in the wind passage 602. It will be understood, however, that in other configurations, the guiding structure may be present in the wind passage 602. For example, the reservoir 604 may be present within the guiding structure and at a distal end of the guiding structure. Further, the guiding structure may be sufficiently larger in diameter than the reservoir 604 such that sufficient wind is allowed to pass around the reservoir 604.

Moreover, in the example depicted in FIG. 6, the charging system 608 is an electrostatic ring having a diameter substantially equal to or greater than the diameter of the nozzle 606. Further, it will be noted that multiple reservoir 604 and nozzle 606 systems may be utilized in this system 600. The multiple reservoir and nozzle systems may be arranged in parallel to each other. In that case, the charging system 608 may have a diameter substantially equal to the combined diameter of an arrangement of the multiple reservoir and nozzle systems. Reference numeral 616 may generally be representative of a distal end of the wind passage 602.

The charge collector 610 may be placed at a location that is distal of the electrostatic ring. Further, the piezoelectric crystals 612 may be coupled to the nozzle 606 and the power supply 614 may be coupled to the charging system 608 and the reservoir 604. In one embodiment, the piezoelectric crystals 612 may also be present within the reservoir 604 to agitate the liquid. For example, the piezoelectric crystals may be present in the form of one or more wires, needles, disc, or rods within the reservoir 604.

In FIG. 6, the reservoir 604 is illustrated with one nozzle 606 for illustrative purposes. However, it will be understood that the EHD system 600 may include any number of nozzles 606 in actual implementation. Droplets 620 are generated in a manner that is substantially similar to the droplet generation method of FIG. 5. Piezoelectric crystals 612 vibrate a liquid 618 in the nozzle 606 and break up a meniscus into a plurality of small droplets 620. The charging system 608 deposits a charge on these droplets 620 and the droplets 620 move towards the charging system 608. As the charge collector 610 is disposed beyond the charging system 608, the droplets 620 move beyond the charging system 608 due to the force of expulsion from the nozzle 606 or the force of the wind and impinge on the charge collector 610, where the charge of the droplets 620 is accumulated. Alternatively, the charge collector 610 may simply be a connection to ground that grounds the charge on the droplets.

It will be understood that the wider opening reservoir of FIGS. 3 and 4 may also be placed within the wind passage 602 of FIG. 6 and wind conversion may be performed as described hereinabove.

In accordance with certain aspects of the present disclosure, the liquid may be any fluid that has low surface tension and can be electrically charged. For example, water, soap solution, salt solution, ethanol, and methanol may be used. The wind energy conversion device as described herein may also be utilized for offshore applications. In such cases, the liquid may be seawater. Seawater has a high content of sodium chloride, which aids in ionization and lowers the surface tension of the water. In dry or low humidity conditions, the water droplets while travelling downstream towards the charge collection grid or ground may evaporate leaving behind a salt crystal as a charge carrier. Therefore, seawater, which may be easily pumped from the offshore location, may be suitable for offshore applications.

In other embodiments, the liquid may be water with added impurities such as dust, pollen, oil, polymer balls and so on. Impurities reduce the surface tension of water and aid in charging the water droplets.

The various embodiments of the exemplary EHD system and method for converting wind into electrical energy using the EHD systems described hereinabove are expected to dramatically increase the efficiency of the wind conversion process. These systems may generate large amounts of droplets per second per cm$^2$ (about 10 million droplets per second cm$^2$ to about 1000 million droplets second per cm$^2$) to increase the cumulative power generated by the wind energy conversion device for the same wind speeds as compared to currently available solutions. Moreover, the systems described hereinabove may generate droplets of very small size (about 0.1 micron to about 100 microns) allowing low speed winds to exert force on the droplets and carry them to the charge collector. Further, because the system may generate a large number of droplets, lower charge may be deposited per droplet as compared to conventional systems. The lower charge per droplet results in low particle mobility, thereby increasing EHD power conversion efficiency. Also, the charge per droplet may be maintained much below Rayleigh limit.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional assemblies and disclosures in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electro-hydrodynamic wind energy conversion system, the system comprising:
    a wind passage allowing wind flow;
    a reservoir having an opening in communication with the wind passage and configured to hold a liquid;
    an agitator coupled to the reservoir and configured to convert the liquid into droplets;
    a charging system disposed substantially opposite to the reservoir opening and configured to:
        deposit an electrostatic charge on the droplets;
        draw the droplets into the wind passage; and
    a charge collector disposed at a distal end of the wind passage and configured to collect the electrostatic charge from the droplets.

2. The system of claim 1, wherein the agitator comprises a vibrating piezoelectric crystal.

3. The system of claim 1, wherein the agitator comprises a rotating disc.

4. The system of claim 1, wherein the wind passage comprises a guiding structure having a longitudinal axis aligned in a direction of wind flow.

5. The system of claim 4, wherein a longitudinal axis of the reservoir is normal to the longitudinal axis of the guiding structure and the reservoir opening is coupled to a side wall of the guiding structure.

6. The system of claim 4, wherein a longitudinal axis of the reservoir is coincident with the longitudinal axis of the guiding structure and the reservoir opening is coplanar with the distal end of the guiding structure.

7. The system of claim 6, wherein the charge collector is disposed distal of the charging system.

8. The system of claim 1, wherein the liquid comprises at least one of seawater, water, ethanol, methanol, soap solution, or combinations thereof.

9. The system of claim 1, wherein the reservoir opening is approximately as large as the width of the reservoir.

10. The system of claim 1, wherein the system is configured to generate droplets in a range from about 10 million droplets per second per cm$^2$ to about 1000 million droplets per second per cm$^2$.

11. The system of claim 1, wherein the diameter of the droplets is in a range from about 0.1 micron to about 100 microns.

12. The system of claim 1, wherein the reservoir opening comprises one or more nozzles, and wherein the one or more nozzles have a diameter that is smaller than the width of the reservoir.

13. The system of claim 1, wherein the charge collector is configured to drive the electrostatic charge of the droplets to ground.

14. An electro-hydrodynamic wind turbine system, the system comprising:
    a wind passage allowing wind flow;
    a substantially tubular guiding structure in line with the wind passage having a proximal end and a distal end and configured to allow the wind flow;
    a reservoir having an opening in communication with the wind passage, coupled to a sidewall of the guiding structure, and configured to hold a liquid;
    an agitator coupled to the reservoir and configured to convert the liquid into droplets;
    a charging system coupled to the guiding structure and configured to:
        deposit an electrostatic charge on the droplets; and
        draw the droplets into the guiding structure; and
    a charge collector disposed at the distal end of the guiding structure and configured to collect the electrostatic charge from the droplets.

15. The system of claim 14, wherein the agitator comprises one or more piezoelectric crystals.

* * * * *